Dec. 8, 1970
C. F. COUSER
3,545,033
IMPLEMENT HINGE
Filed April 16, 1968
2 Sheets-Sheet 1
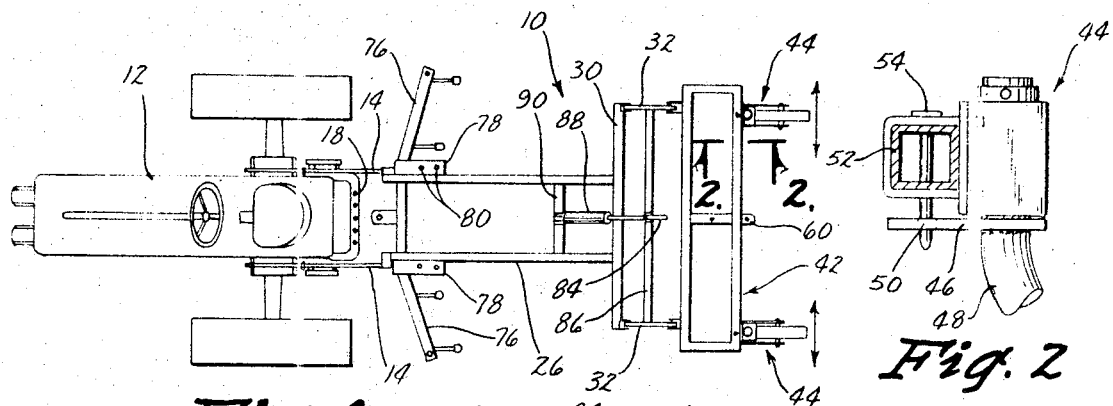
Fig. 1
Fig. 2
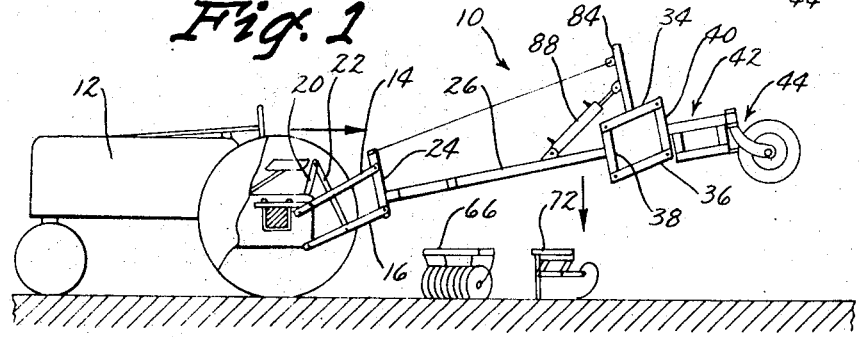
Fig. 3
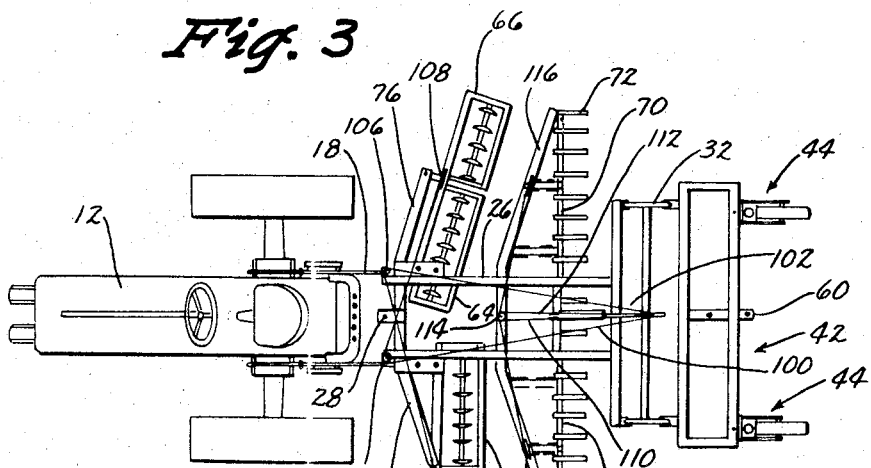
Fig. 4
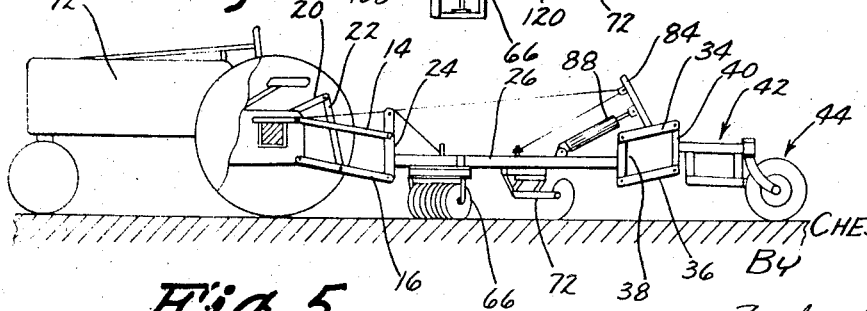
Fig. 5
INVENTOR
CHESTER F. COUSER
BY
Zarley, McKee & Thomte
ATTORNEYS

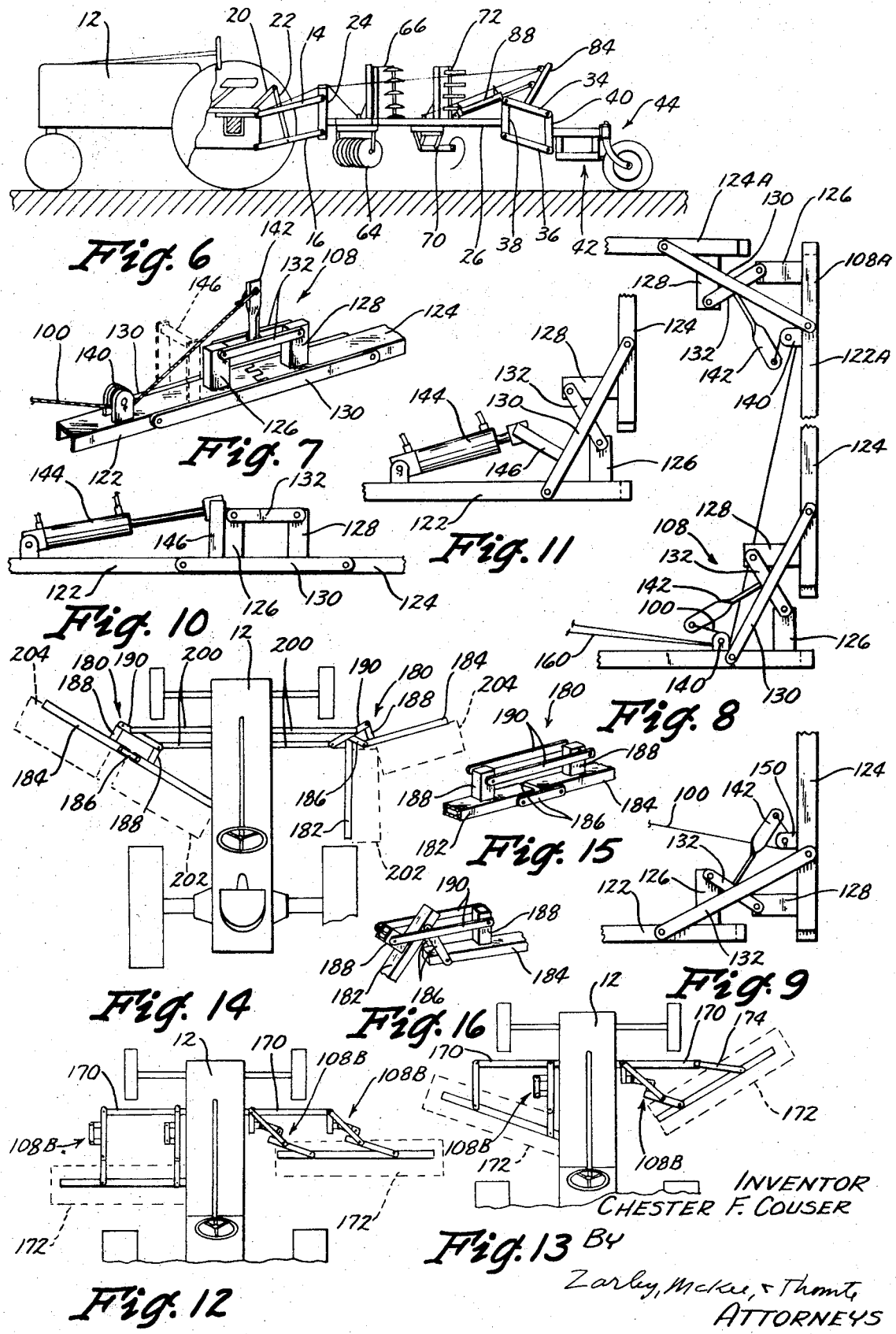

United States Patent Office 3,545,033
Patented Dec. 8, 1970

3,545,033
IMPLEMENT HINGE
Chester F. Couser, Zearing, Iowa 50278
Filed Apr. 16, 1968, Ser. No. 721,845
Int. Cl. E05d 3/06
U.S. Cl. 16—163                                              9 Claims

ABSTRACT OF THE DISCLOSURE

A device for interconnecting a pair of units to position them selectively at different positions relative to each other. The hinge device may be effectively used for connecting farm implement sections to transport carriers or to the tractor to raise and lower the implement section or to move the implement sections inwardly and outwardly to alter the effective width of the implement. The hinge in either of its two forms involves a pair of linkages having different lengths wherein one of the linkages extends between the two frame members and the second linkage extends between a pair of posts extending perpendicularly from the frame members. The hinges may be operated mechanically, hydraulically or manually and may be used in an infinite number of ways.

---

The transport carrier device of this invention is particularly versatile in that it can be raised by the lift arms of the tractor completely off of the ground to extend over the implements and then be lowered over the implements for their securement thereto. The front end may be raised and lowered by the lift arms on the tractor while the rearend may also be raised and lowered by a hydraulic cylinder operable on a parallelogram connecting the rearend of the implement to a pair of rear support caster wheels. The caster wheels may be locked against rotation if desired as when the implement is being pulled behind a truck or the like at high speeds on the highway. Similarly, the implement may be connected directly to a truck or the like to be pulled on a highway.

The implement sections which may be disc sections or spring-tooth harrow sections or the like fit underneath the implement frame and may be adjusted to the desired angle. Through the use of a unique hinge arrangement connecting the center implement sections to wing section one or more wing sections may be used at each end so that they will be pivoted from a horizontal position to a vertical raised position. A cable arrangement is shown operable by the hydraulic cylinder connected to the parallelogram structure at the rear of the transport frame.

A pair of special hinges have been provided which facilitate raising and lowering wing sections and varying the angle of implement sections carried either forwardly or rearwardly on the tractor. It is always a problem on tractor carried implements to reduce their overall width for going through gates and moving them on the highway. This hinge device will permit accomplishment of these objectives. The different positions that the hinges may be moved to is almost infinite and they may be connected in series to further increase their utility and give greater versatility.

These and other features and advantages of this invention will become readily apparent to those skilled in the art upon reference to the following description when taken into consideration with the accompanying drawings, wherein:

FIG. 1 is a top plan view of the implement transport carrier;

FIG. 2 is a cross-sectional view taken along line 2—2 in FIG. 1;

FIG. 3 is a side elevation view of the unit shown in FIG. 1 but with the transport carrier in its raised position over the implements which are to be mounted on the carrier;

FIG. 4 is a top plan view of the transport carrier connected to the implements but showing the disc sections at different angles;

FIG. 5 is a side elevation view of the unit shown in FIG. 4;

FIG. 6 is a side elevation view similar to FIG. 5 but showing the implements in their raised condition above the ground with the wing units pivoted to an upstanding position;

FIG. 7 is a perspective view of a hinge device used for connecting the wing sections of the implement to the center sections;

FIG. 8 is an elevational view of a pair of the hinge devices of FIG. 7 connected together through a common frame member to permit usage of two wing implement sections and the pivoting of both of them to 90 and 180 degree positions to reduce the total effective width of the implement;

FIG. 9 is a fragmentary side view of the hinge of FIG. 7 but showing it pivoted to a different position wherein the outer wing frame member is not raised as high or moved in as far as it is as shown in FIG. 8;

FIG. 10 is a view similar to FIG. 9 but showing the hinge operable by a hydraulic cylinder;

FIG. 11 is a view similar to FIG. 10 but showing the hinge moved through 90 degrees as is the case when a wing section of an implement is carried and it is raised to an upstanding position as shown in FIG. 6;

FIG. 12 is a fragmentary top plan view of the hinge of FIG. 7 being used to connect implement sections to the tractor between the front and rear wheels and further showing the different positions to which the implement sections may be moved;

FIG. 13 is a view similar to FIG. 12 but showing only one of the hinges for each implement section;

FIG. 14 is a top plan view similar to FIG. 13 but showing a second alternate hinge connecting the implement sections to the tractor between the front and rear wheels;

FIG. 15 is a perspective view of the hinge of FIG. 14; and

FIG. 16 is a view similar to FIG. 15 but showing the hinge moved to another position of use.

The implement transport carrier is referred to generally in FIG. 1 by the reference numeral 10 and is shown connected to a tractor 12.

The tractor 12 includes top and bottom lift arms 14 and 16 on opposite sides of the rear end in the area of the conventional drawbar 18. The lift arms are disposed in parallel relationship and thus pivot together when raised and lowered by a powered linkage including lever 20 and member 22 connected to the bottom bar 16. The rear ends of the bars 14 and 16 are connected to vertically disposed posts 24 at the forward end of longitudinally extending transport frame members 26. A transversely extending frame member is positioned between the post 24 at the bottom thereof and is provided with a conventional hitch 28 which is used to connect the transport to a truck or the like for road transporting.

The longitudinally extending frame members 26 extend rearwardly and connect to a transversely extending member 30 which is provided with a pair of parallelogram units 32 at each of its ends. The parallelogram units include top bars 34 and bottom bars 36 with front and rear vertical barn 38 and 40. A storage container carrier 42 is then connected to the rear of the vertical bars 40 and is provided at its rear edge with a pair of caster wheels 44. A plate 46 is carried on the vertical post 48 of the caster wheels and has an opening 50 which is adapted to align with an opening through the rear channel member 52 and thus receive a locking pin 54 to maintain the caster wheels against pivotal turning action when the transport carrier is being used on the highway or the like. A rearwardly extending tongue 60 is provided on the storage container carrier 42 to connect one or more other implements if desired.

As seen in FIGS. 3, 4, 5 and 6, one arrangement of implements that may be carried by the transport 10 is right and left front disc sections 64 with wing disc sections 66 and rearwardly positioned spring-tooth harrow sections 68 and 70 also having wing sections 72.

In FIGS. 1 and 4 it is seen that the disc sections are connected to outwardly extending wing frame members 76 which include rearwardly extending plate elements 78 adjacent the longitudinally extending frame members 26. A series of holes 80 are provided in the plate elements 78 to selectively position the disc sections 64 at the desired angle as seen in FIG. 4 wherein the left hand disc section is substantialy transversely positioned while the right hand disc section 64 is angled to the rear by virtue of the adjustability provided by the plates 78.

The wing sections 66 and 72 are connected to the center sections 64 and 70 through special hinges which are shown in greater detail in FIGS. 7 through 16 and will be described hereinafter.

The operation of the transport 10 involves the use of an upstanding post 84 carried on the center of a transversely extending member 86 extending between the top members 34 of the parallelograms 32. A hydraulic cylinder 88 is connected to the upstanding post 84 and is anchored to a cross-frame piece 90 extending between the longitudinal frame members 26.

The wing sections are connected by a cable arrangement to the post 84 and are also raised and lowered as the transport is raised and lowered. As to the front wing sections 66, a pair of cables 100 and 102 extend from the upper end of the post 84 to pulleys 104 and 106 on the post 24 at the forward end of the frame members 26 and then transversely across to the opposite sides where they are connected to the hinges 108 as will be hereinafter described and as is illustrated in FIGS. 7 through 16. The rear springtooth implement wing sections 72 are raised by a second pair of cables 110 and 112 extending around a pulley 114 on a transversely extending frame 116 and thence to the wing sections 72 where the cable ends engage the special hinges of FIGS. 7 through 16. Thus as the post 84 is moved from the position of FIG. 5 to the position of FIG. 6 the cables are pulled tight and extended to raise or pivot upwardly the wing sections 66 and 72. Conversely when the implement is lowered by the cylinder 88 being contracted the cables are loosened and the wing sections moved by gravity to their horizontal positions of FIG. 4.

It is thus seen that by use of the hydraulic lift arrangement on the tractor the front end of the implement transport may be selectively positioned at the desired height above the ground to the extent that the whole transport extends over the implements as seen in FIG. 3 or is lowered to ground working position as seen in FIG. 5. The rear hydraulic cylinder 88 may be operated independently or together with the tractor hydraulic system to raise and lower the rear end of the transport 10 as seen in FIGS. 5 and 6.

The hinges 108 and 120 for the wing disc sections and the springtooth harrow sections will now be described and discussed in terms of their other uses. In FIG. 7 a hinge generally referred to by the reference numeral 108 is shown to be comprised of a pair of channel frame members 122 and 124 having upstanding posts 126 and 128 adjacent their inner adjacent ends which are in registering relationship with each other. A pair of strap linkage members 130 are pivotally connected to the opposite sides of the frame members 122 and 124 while a pair of strap members 132 are pivotally connected to the upper ends of the posts 126 and 128. It is important to note that the distance between the pivotal axes of the linkages 132 is substantially less than the distance between the pivotal axes of the linkage straps 130 and thus the right hand frame member 124 may be pivoted counter-clockwise as seen in FIGS. 8 and 11 wherein the shorter linkage 132 is pivoted upwardly in a counter-clockwise direction or the outer frame member 124 may be pivoted counter-clockwise with the linkage 132 being pivoted clockwise as seen in FIG. 9. In either event the frame member 124 assumes a vertical position after having been pivoted 90 degrees relative to the frame member 122. It is seen that between the positions of FIGS. 8, 11 and 9 that the frame member 124 in FIGS. 8 and 11 is higher and further to the left while in the position of FIG. 9 the frame member 124 is lower and further outwardly. Therefore a narrower width may be accomplished by operating the linkage 108 as shown in FIGS. 8 and 11.

As the way of an example the hinge 108 is shown operated by the cable 100 shown in FIG. 4 and is entrained under a pulley 140 and then is anchored on an upstanding element 142 rigidly secured between the linkage plates 132. In FIGS. 10 and 11 the cable 100 is replaced by a cylinder 144 which is connected to an upstanding cross shaft 146 rigidly connected to the linkage plate 130 and thus the hinge may be moved to the same positions as accomplished by the cable. In FIG. 9 however the clockwise movement of the linkage 132 is accomplished by placing a pulley 150 on the frame member 124 and then extending the cable 100 under that pulley and anchoring it to the upstanding member 142.

In FIG. 8 the arrangement of the hinge 108 shown in FIG. 7 is illustrated wherein the linkage 132 has been pivoted counter-clockwise by the cable 100 shown but additionally a second cable 160 is entrained under the pulley 140 and extends to a pulley 140 on a second hinge 108A which has a common frame member 122A with the frame 124 of the first hinge 108. Accordingly the frame member 124A may carry a wing disc section or the like as well as the frame 124 and thus both implements may be pivoted from a horizontal position to the vertical position by the frame 124 and to an upside down horizontal position on the frame 124A.

In FIG. 12 a pair of hinges 108B are shown connected to a transversely extending frame member 170 on opposite sides of a tractor between the front and rear wheels thereof and carry on their outer ends an implement section 172 which is shown on the left side to be rearwardly and inwardly disposed while on the right side the hinges 108B have been opened up somewhat to move the implement section 172 forwardly and outwardly. In FIG. 13 only the connections of the implements 172 adjacent the tractor are provided with the hinges 108B while the outer ends are connected to the transversely extending transport arms 170 by conventional pivot links 174 and thus it is seen that a still different angle variation may be obtained.

An alternate hinge arrangement is shown in FIGS. 14, 15 and 16 and is referred to generally by the reference numeral 180. This hinge includes a pair of frame members 182 and 184 pivotally interconnected at their closely adjacent inner ends by a pair of linkage plates 186 positioned on opposite sides thereof. An upstanding post 188 is positioned on each of the frame members 182 and 184 outwardly of the linkage plates 186. The upstanding posts 188 are then interconnected by a pair of spaced apart linkage plates 190 such that the linkage plates 186 may be pivoted upwardly between the linkage plates 190 to the position seen in FIG. 14. The tractor 12 in FIG. 14 has a pair of laterally extending frame members 200 on opposite sides which rigidly connect to the linkage 190 to position disc sections or the like 202 and 204 at an angle relative to the longitudinal axis of the line of travel but as seen on the right hand side the overall outer extension of the outer section 204 is reduced by the operation of the linkage 180 which when pivoted moves the outer section 204 rearwardly and inwardly and the intersection 202 outwardly and rearwardly to reduce the overall width of the tractor and implement.

Some changes may be made in the construction and arrangement of my implement hinge without departing from the real spirit and purpose of my invention, and it is my intention to cover by my claims, any modified forms of structure or use of mechanical equivalents which may be reasonably included within their scope.

I claim:
1. A hinge, comprising:
   a pair of frame members disposed end to end,
   an upstanding post on each of said frame members and each of said posts extending in the same direction,
   a linkage pivotally interconnecting said posts, and
   a second linkage pivotally interconnecting said frame members.
2. The structrue of claim 1 wherein the distances between the pivotal axes of said first and second linkages is substantially different.
3. The structure of claim 2 wherein the distance between the pivotal axis of said second linkage is substantially greater than the distance between the pivotal axis of said first linkage.
4. The structure of claim 3 wherein said second linkage includes a pair of connecting elements on opposite sides of said pair of frame members.
5. The structure of claim 2 wherein the distance between the pivotal axis of said second linkage is substantially less than the distance between the pivotal axis of said first linkage.
6. The structure of claim 5 wherein the opposing adjacent inner ends of said frame members between the posts are interconnected by said second linkage.
7. The structure of claim 3 wherein the opposing adjacent inner ends of said frame members between the posts are independently movable of each other.
8. The structure of claim 6 wherein said first linkage includes a pair of spaced apart plates disposed on opposite sides of said posts a sufficient amount for the inner ends of said frame members to pivot therebetween at times.
9. The structure of claim 7 wherein a second hinge similar in construction and operation is connected to said first hinge through a common frame member and a cable means is connected to said first and second hinges to provide effective pivotal movement from a position of end to end alignment of at least 180 degrees.

References Cited
UNITED STATES PATENTS

| | | | |
|---|---|---|---|
| 2,967,035 | 1/1961 | Simons | 16—163 |
| 2,154,970 | 4/1939 | Briggs | 172—484 |

BOBBY R. GAY, Primary Examiner

D. L. TROUTMAN, Assistant Examiner

U.S. Cl. X.R.
172—484